United States Patent [19]

McAlister

[11] Patent Number: 4,714,513
[45] Date of Patent: Dec. 22, 1987

[54] APPARATUS FOR FUSHION WELDING PLASTIC PIPE JOINTS

[76] Inventor: Roy E. McAlister, 5285 N. Red Rock Dr., Phoenix, Ariz. 85018

[21] Appl. No.: 598,154

[22] Filed: Apr. 9, 1984

[51] Int. Cl.$^4$ .................. B29C 65/02; B29C 65/18
[52] U.S. Cl. .................. 156/359; 156/158; 156/294; 156/366; 156/423; 156/499; 156/579; 219/228; 269/6; 269/271; 269/282
[58] Field of Search ............ 156/158, 294, 296, 309.9, 156/359, 366, 423, 499, 503, 579, 583.1, 304.2, 304.6; 219/228, 243; 269/2, 6, 279, 282, 271, 257

[56] References Cited

U.S. PATENT DOCUMENTS

| | | | |
|---|---|---|---|
| 2,389,243 | 11/1945 | Tillett | 269/271 |
| 3,147,794 | 9/1964 | Shupe et al. | 219/228 |
| 3,727,289 | 4/1973 | Bemelmann et al. | 156/158 |
| 3,802,943 | 4/1974 | Province | 156/583.1 |
| 3,929,541 | 12/1975 | Spears et al. | 156/296 |
| 4,227,067 | 10/1980 | McElroy | 156/499 |
| 4,336,652 | 6/1982 | Robertson | 30/258 |
| 4,378,937 | 4/1983 | Dearman | 269/6 |
| 4,484,975 | 11/1984 | McElroy | 156/579 |

Primary Examiner—Michael Wityshyn
Attorney, Agent, or Firm—Cushman, Darby & Cushman

[57] ABSTRACT

Apparatus for use in fushion welding joints in a plastic pipe system comprising a heating device including a housing providing a rearwardly disposed pistol grip handle, a heating member secured in heat insulating relation to the housing in a forwardly extending position with respect to the pistol grip handle, a secondary handle structure detachably fixedly secured to a side of the housing at one end thereof and extending outwardly therefrom having an adjustable depth gauge on the outer end thereof for receiving the end of a plastic pipe and determining the depth to which the pipe end should be heated to fushion weld the same into a mating socket of a plastic fitting, a clamping device operable to be clamped in rounding engagement with the exterior periphery of the plastic pipe at a position inwardly of the depth thereof determined by the depth gauge, heatable socket and plug members detachably fixedly secured to the heating member for receiving in heat conducting relation a plastic pipe end and a mating socket of a plastic fitting, and a timing signal for providing signals for enabling an operator to determine the time when the pipe end and mating socket should be removed from heat transmitting relation with the heated socket and plug members respectively.

37 Claims, 10 Drawing Figures

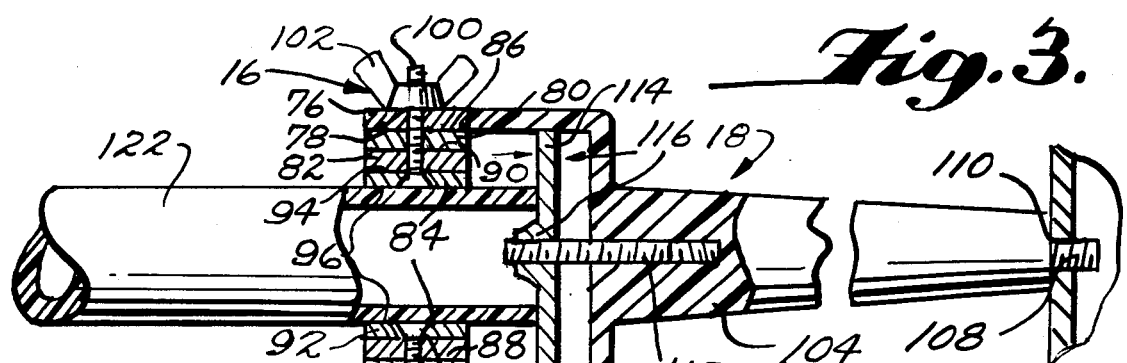
Fig. 3.
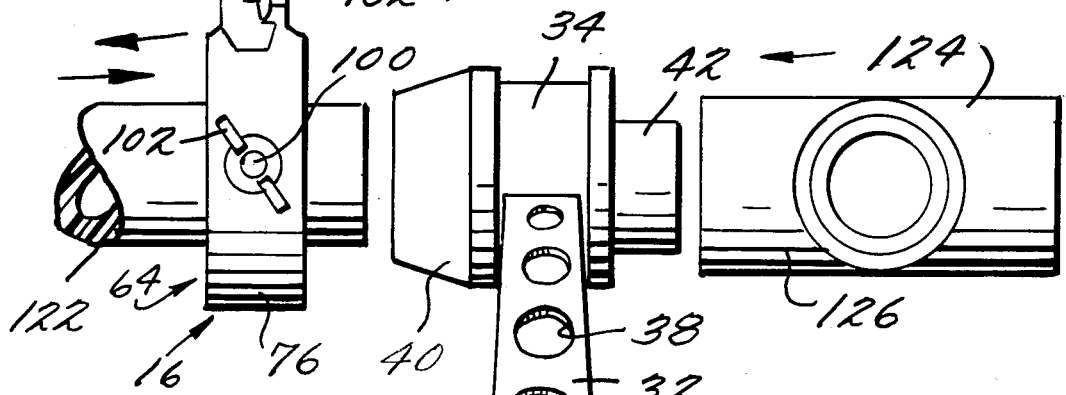
Fig. 4.
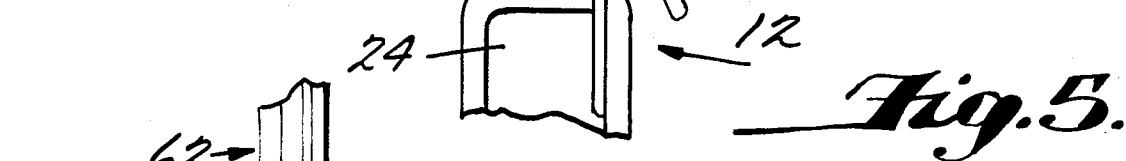
Fig. 5.
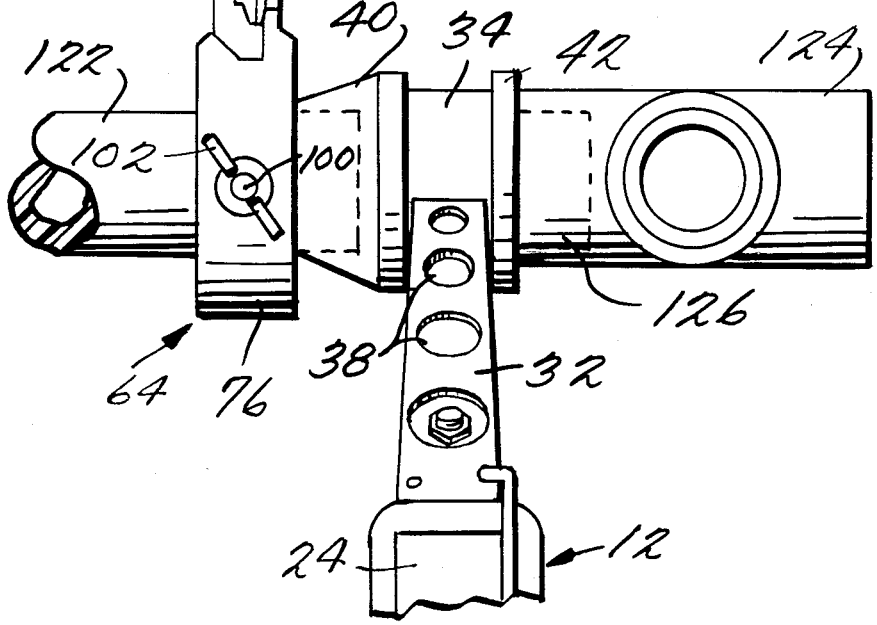

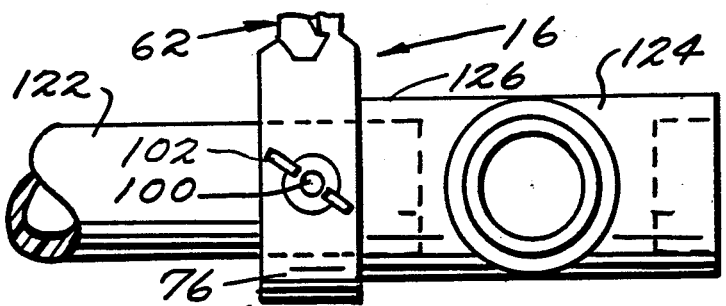
Fig. 6.
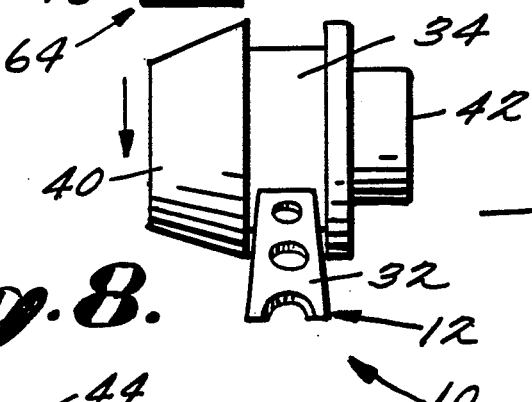
Fig. 8.
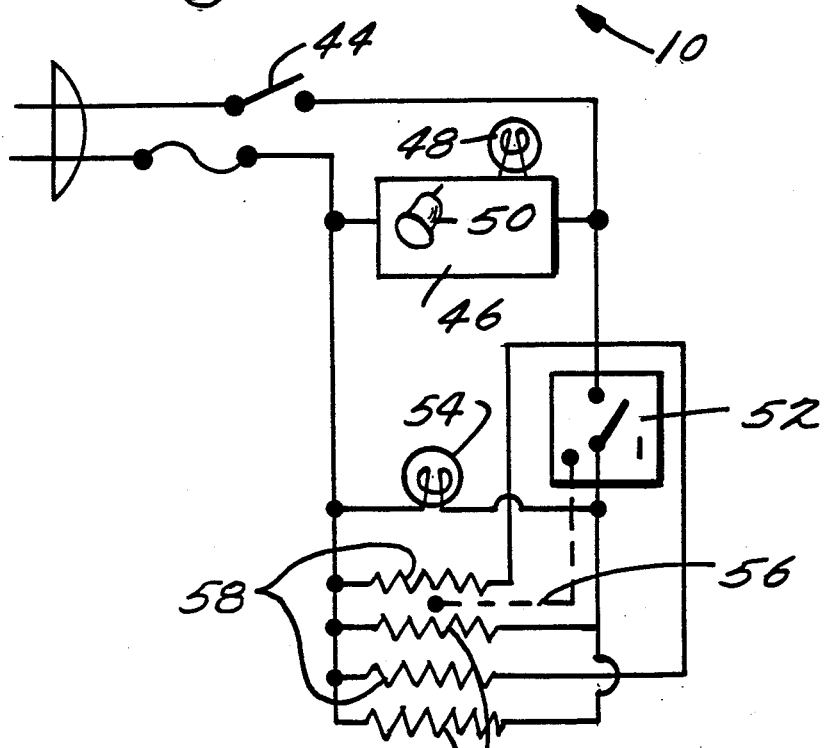
Fig. 7.
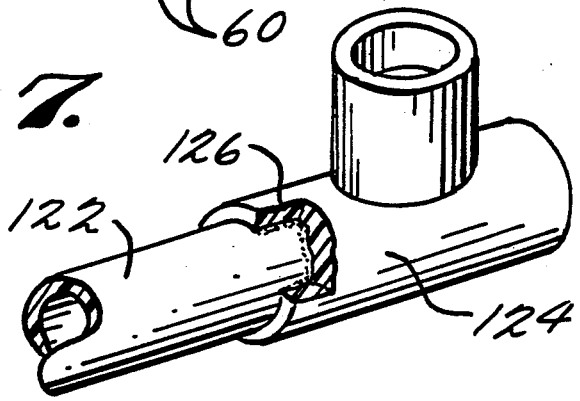

APPARATUS FOR FUSHION WELDING PLASTIC PIPE JOINTS

This invention relates to fusion welding of thermoplastic pipe joints and, more particularly, to apparatus for effecting such fusion welding.

The utilization of plastic pipe systems in situations where metal pipes have heretofore been utilized is becoming more and more prevalent. Examples of systems where thermoplastic pipe components have replaced metal pipe components include polyethylene natural gas delivery systems, polypropylene water service, polybutylene hot and cold water service, polybutylene fire-sprinkler water distribution systems, polybutylene compressor-air distribution systems for shops and factories and polyvinylidene fluoride piping systems used in elevated temperature and highly chemically corrosive installations. In situations where the pipe system is built with the installation, highly sophisticated apparatus can be employed for effecting welds of the various joints required in the system. Various methods are utilized including cementing and solvents. One of the installations which is becoming more and more prevalent is the installation of fire-fighting water distribution systems, particularly the installation of systems in existing building structures. Such an installation requires that the welded joints be effected in an overhead position presenting maximum inconvenience to the installer. The utilization of cements and solvents in installations of this type presents health and fire hazards.

One procedure which has been accepted is to effect the weld simply by the addition of heat. Heating devices for effecting the fusion welding of thermoplastic pipe joints have been commerciallly available for many years. A typical example of a device of this type is disclosed in U.S. Pat. No. 3,802,943, dated Apr. 9, 1974. An earlier device of this type contained in the expired patented prior art is disclosed in U.S. Pat. No. 3,147,794, dated Sept. 8, 1964. The prior art device suffers from being, perhaps, too simplistic. The device as depicted in the later patent consists essentially of an elongatged handle having a heating member on one end thereof which carries a heatable socket member on one side and heatable plug member on the other. The socket member serves to heat the end of the pipe forming the joint to be fused and the plug member serves to heat the socket portion of the fitting of the joint to be fused. While not disclosed in the patents, in actual practice to accommodate different size joints, the heatable socket and plug members are detachably secured to the heating member so as to be replaceable as a selected set of a series of different size socket and plug sets provided to accommodate the full range of joint sizes that may occur in a complete pipe system. While not disclosed in the patents, the overall apparatus included accessories such as a series of different sized depth gauges and a series of different sized pipe clamps.

The installation of an overhead sprinkling system in existing buildings presents a situation of 15 extreme difficulty in effecting the fusion welding of the thermoplastic pipe joints of the system. The difficulty factor gives rise to the need for modifying the simplistic prior art device to provide greater convenience and the ability to readily accommodate different size joints as they are encountered without the need of constantly getting up and down from a ladder and without the need of more than one person to effect operation.

It is an object of the present invention to provide apparatus for fusion welding of thermoplastic pipe joints which meet the needs stated above. In accordance with the principles of the present invention, this objective is obtained by providing apparatus which includes a heating device having a housing providing a rearwardly disposed pistol grip handle and the heating member disposed forwardly of the pistol grip handle in heat insulating relation to the housing so that opposed sides thereof face in directions corresponding to opposed sides of the pistol grip handle. With this arrangement, it becomes much more convenient for an operator to position the heating device with respect to the pipe and fitting to be joined. The heating device is also provided with a secondary handle which carries in its outer end a depth gauge means for determining the depth to which the pipe end should be heated and inserted in the fusion welding process. The apparatus also includes a clamping device operable to be clamped in rounding engagement with the exterior periphery of the plastic pipe at a position inwardly of the depth thereof determined by the depth gauge means. In order to provide the operator with a convenient and accurate means for determining the amount of heating time for the plastic pipe end within the heatable socket member on one side of the heating member and for the mating socket of a plastic fitting over the heatable plug member on the other side of the heating member, the invention has a timing signal providing means. The timing signal provided does away with the old system of requiring the operator himself to judge the heating time without benefit of mechanical accuracy.

Preferably, the time signal provided consists of a series of signals of short duration spaced apart by predetermined constant time intervals. Specific preference is to provide both a flash of light and a simultaneous audible beep at one second time lntervals.

Additional conveniences which are preferably provided include the provision of means for adjusting the depth gauge so as to eliminate the need for providing and handling a series of depth gauges. A further preferred feature of convenience is to provide the clamping device with a set of separate arcuate sizing members capable of rendering the clamping device suitable for use on a fair size range of different pipes or tubes. Here again, the need to provide and handle a series of different clamping devices is eliminated.

Another preferred feature of convenience is the provision of a stationary mount for the heating device which is capable of holding the same in a fixed position of operation where a hand held operation is not required. Preferably, such a support may be in the form of a C-clamp enabling it to be used on ladders and other similar structures. Alternatively, the support can be a hinged element mounted with respect to a table top surface and a side pocket for receiving the heating device so that the latter can be moved between an operative position above the table top surface and a storage position within the side pocket.

Still another preferred feature of convenience is the provision of at least one shield for the outer end of the adjacent heatable member, which shield can be moved between a shielding position and an operating position accessing the adjacent heatable member.

Another object of the present invention is the provision of apparatus of the type described which is rugged in construction, easy and convenient in operation and economical to manufacture.

These and other objects of the present invention will become more apparent during the course of the following detailed description and appended claims.

The invention may best be understood with reference to the accompanying drawings, wherein an illustrative embodiment is shown.

In the drawings:

FIG. 3 is a sectional view showing a first step in the use of the apparatus to effect the fusion welded joint wherein the clamping device is secured to the pipe end at a position determined by the depth gauge assembly;

FIG. 4 is a perspective view illustrating the start of the second step in the utilization of the apparatus in effecting the fusion welded joint;

FIG. 5 is a view similar to FIG. 4 showing the completion of the second step;

FIG. 6 is a view similar to FIG. 4 showing the final step in the utilization of the apparatus in effecting a fusion welded joint;

FIG. 7 is a perspective view of the fusion welded joint formed by the utilization of the apparatus with parts broken away for purposes of clearer illustration;

FIG. 8 is a schematic wiring diagram of the heating circuit and controls utilized in the heating device of the apparatus;

Figure 9:
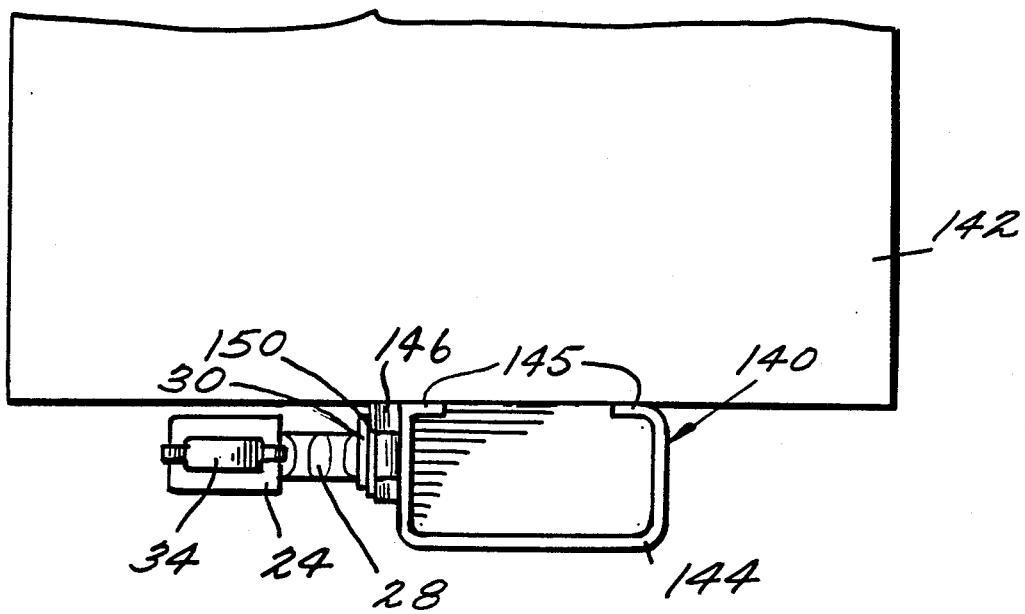
Figure 10:
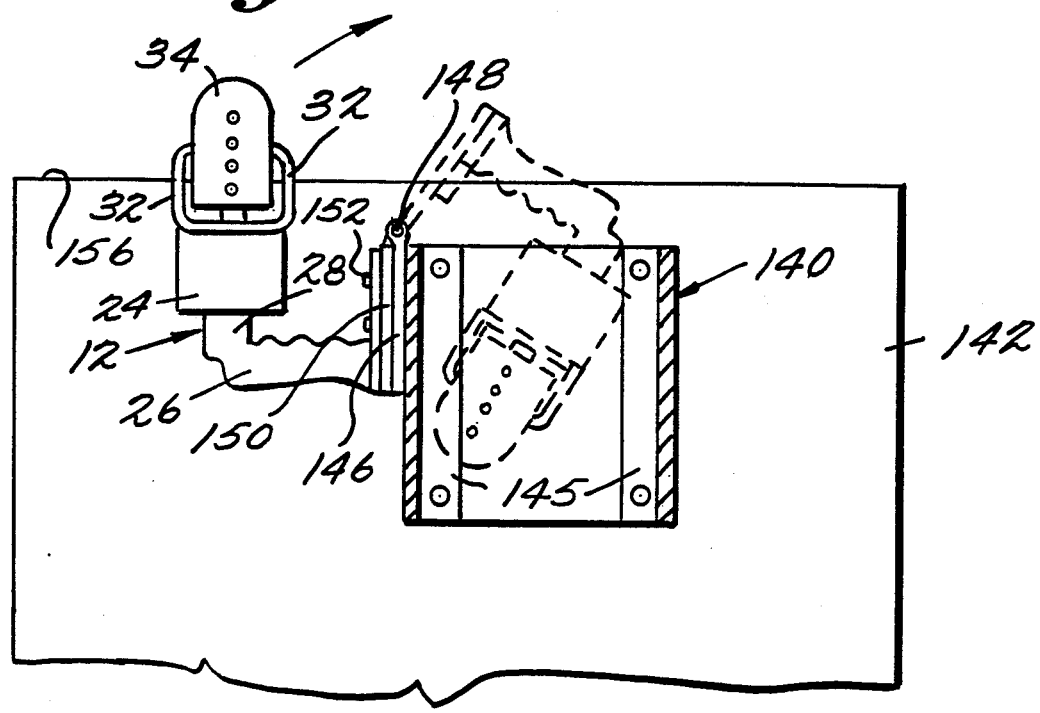

FIG. 9 is a top plan view of a table showing another form of mounting accessory for the heating device which serves to support the latter for movement between an operative position wherein the heatable members thereof extend above the table top and a storage position wherein the heating device is contained within a side pocket provided by the accessory; and FIG. 10 is a side elevational view of the apparatus shown in FIG. 9.

Figure 1:
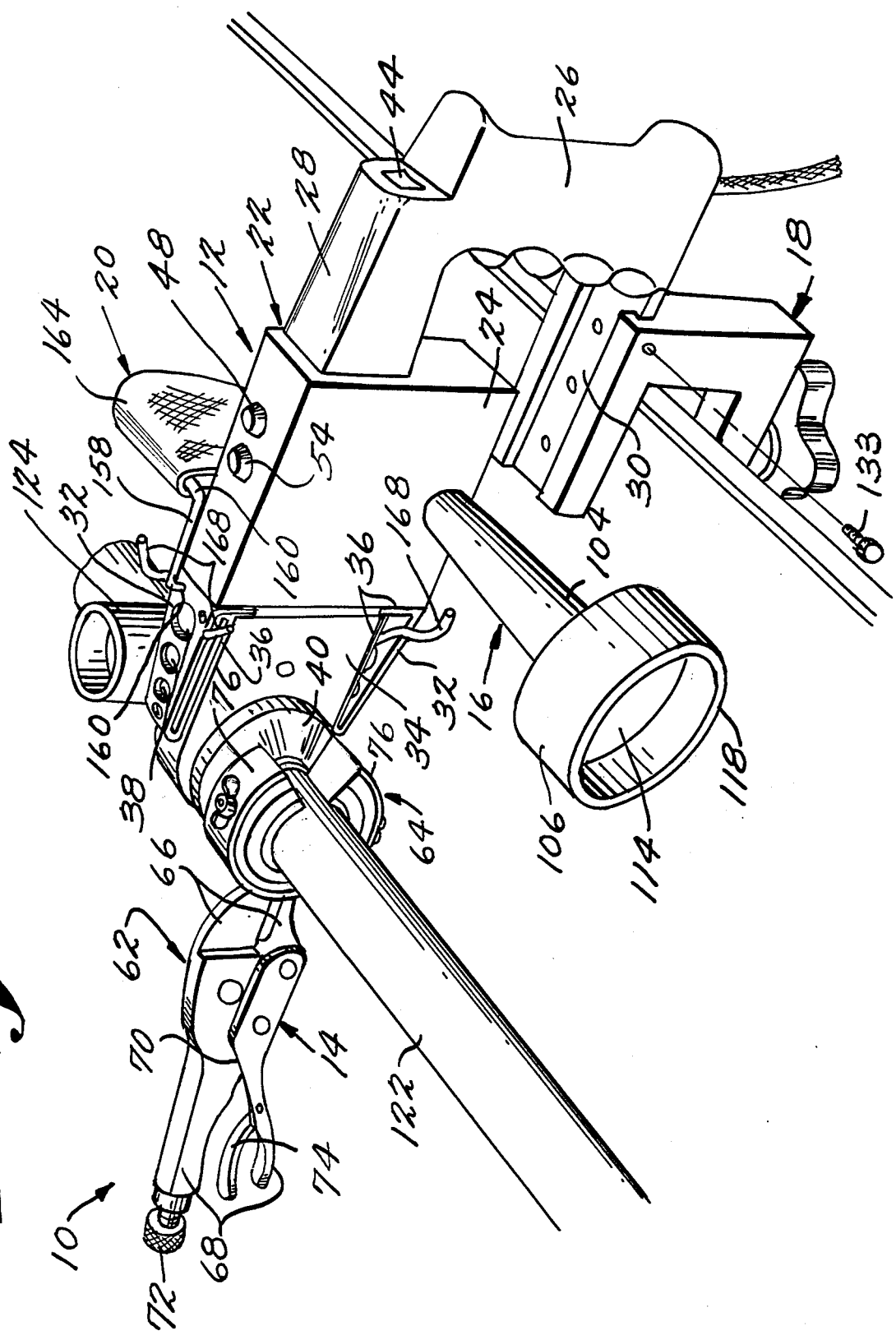
FIG. 1 is a perspective view of an apparatus for fusion welding a thermoplastic pipe joint embodying the principles of the present invention showing the apparatus mounted on a table top in fixed operative position.
Figure 2:
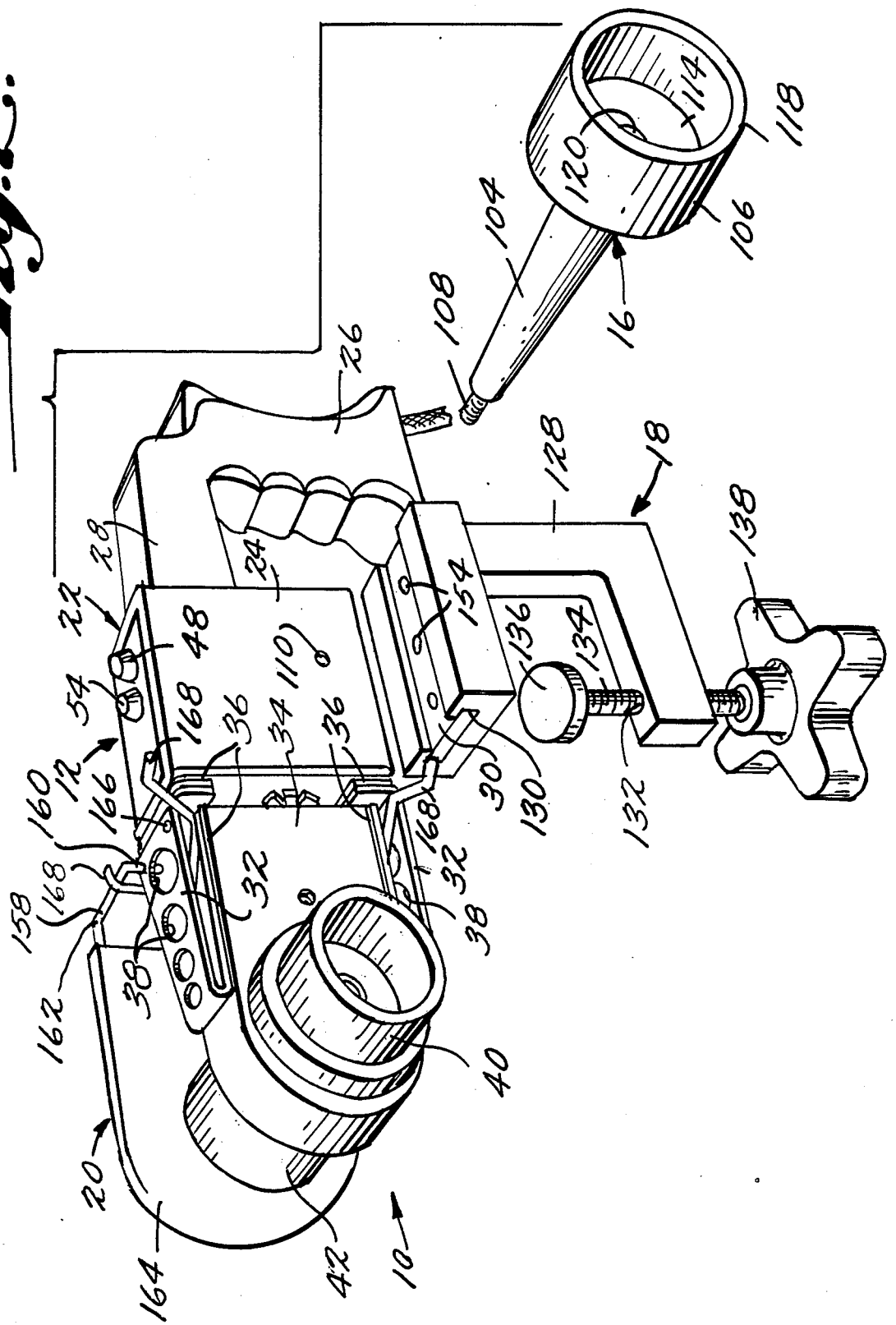
FIG. 2 is a perspective view of the heating device of the apparatus with the depth gauge assembly shown in exploded relation with respect to the heating device.

Referring now more particularly to FIGS. 1 and 2 of the drawings, there is shown therein an apparatus, generally indicated at 10, embodying the principles of the present invention for use in fusion welding joints of a plastic pipe system. As shown, the apparatus 10 includes a heating device, generally indicated at 12, and a separate pipe clamping device, generally indicated at 14. The heating device 12 is shown with certain preferred accessories detachably secured thereto, including a secondary handle and depth gauge assembly, generally indicated at 16; a C-clamp mounting assembly, generally indicated at 18; and a shield assembly, generally indicated at 20.

As shown, the basic heating device 12 includes a housing, generally indicated at 22, which is made up of a hollow rectangular box-like housing structure 24, having a pistol grip handle 26 disposed in rearwardly spaced relation with respect thereto. The pistol grip handle 26 has an integral mounting portion 28 extending forwardly from the upper end thereof. The forward end of the mounting portion 28 is suitably fixed to the upper rearward end of the housing structure 24. Fixed to the lower end of the pistol grip handle 26 and extending forwardly therefrom is an apertured mounting plate 30 arranged to be detachably fixedly secured to the C-clamp mounting assembly 18.

The box shaped housing structure 24 has a pair of hairpin spring-like mounting brackets 32 fixed thereto, which serve to mount a heating platen member 34 in a forwardly disposed position with respect to the housing 22 in both heat insulating and shock absorbing relation with respect to housing structure 24 thereof. The heating member 34 includes opposed planar heating surfaces which face in opposite directions corresponding with the opposite directions in which the sides of the pistol grip handle 26 face.

Brackets 32 are preferably made of steel straps (e.g. 300 series stainless steel 18% Cr, 8% Ni) or of titanium alloy (6A1, 4 V) so as to present a low conductivity extended path length mounting component. While the ends of the brackets could be connected directly to the heating member 34 and the housing structure 24, it is preferable to effect connection with interposed pads of insulative material 36. A preferred material is a composite of 3 to 10 layers of transparent dielectric material separated by alternate layers of highly reflective materials. A preferred specific embodiment consists essentially of six 0.003 inch layers of mica separated by 5 layers of 0.0005 inch aluminum foil. As shown, each bracket 32 is formed with a series of holes 38 to facilitate the mounting of the brackets to the heating member 34 as by screws or the like to create a large surface to volume ratio and to provide convection-current buoyant forces by heating the air in the holes and within brackets 32.

Detachably mounted to one side of the heating member 34 is a heatable combination plug and socket 40. A heatable plug or socket member 42 is detachably mounted on the opposite side of the heating member 34, preferably in axial alignment with the combination plug and socket member 40. It will be understood that combination plug and socket members 40 and socket members 42 or step up or step down sizes of member 40 constitute one pair of a set of pairs of socket and plug members of various incremental sizes suitable to accommodate the different size joints encountered in a plastic pipe system. It is to be understood that two sets of heating members 40 and 42 may be simultaneously mounted on platen 34 which enables at least two sizes of pipe or tube and corresponding fittings to be welded using one set up. In instances, a third size may be welded out of the combination of plugs and sockets mounted. Platen 34 is provided with at least four mounting holes to accommodate the mounting of two different sized sets of heating faces 40 and 42. Any suitable means may be provided for effecting the detachable connection of the members 40 and 42 with the heating member, as, for example, conventional fasteners. The interior configuration of the socket member 40 is such as to receive the exterior surfaces of the pipe end and to impart a slight taper thereto. Similarly, the exterior plug detail of 40 is such as to receive the interior surfaces of a larger socket portion of a pipe or tube fitting and to impart a slight taper thereto. In this way when the pipe end is heated it can be moved within the heated socket portion of the fitting into a position of fused interengagement. Preferably, all of the surfaces of the combination plug and socket member 40 which are engageable with the fitting socket or pipe end are provided with an anti-stick coating which will enable the heated thermoplastic to be released therefrom without sticking or drawing threads. Similarly, all of the surfaces of the socket and plug areas of member 42 which engage the pipe or tube ends or the socket portion of the fitting are likewise coated with an anti-stick coating. Any well-known coating material may be utilized, such as Teflon ® or the like.

Referring now more particularly to FIG. 8, there is shown therein a schematic wiring diagram which includes components embodied in the housing structure 24, as well as components within the heating element to accomplish the actual heating thereof. As shown, 115 VAC line voltage is applied by a push-on, push-off or toggle switch 44. When switch 44 is on, a timing component 46 actuates a flashing light 48 and a tone transducer 50. Timing component 46 may consist of a synchronous motor drive with any suitable timing frequency, such as a one cycle per second output speed acting in cooperation with a suitable switch, such as a magnetic reed switch or a cam actuated microswitch, carrying bursts of current at the motor shaft frequency. Components 48 and 50 may be rated for use at 115 VAC or may be lower-voltage components wherein a voltage-divider circuit or transformer is used to produce the appropriate voltage.

Timing component 46 may be a solid-state device that provides drives to a solid state tone transducer and a solid-state light-emitting diode. "Engineer's Notebook II" First Edition, Second Printing 1982 by Forrest M. Mims III published by Tandy Corporation, provides several exemplary solid state circuits for driving 48 and 50 on one second intervals including "Display Flasher" on page 36, "Led Flasher" on page 88, "Back and Forth Flasher" on page 94, "Interval Timer" on page 100, and "Fully Adjustable Pulse Generator" on page 103.

A further presentation of control information is to turn indicator light 48 on continuously if the temperature is below the set point temperature. This may be accomplished by operating light 48 responsive to the signal from a temperature control component 52 and to the signal from timing circuit 46. A further feature would be to use an indicator light 48 that changes color when operating on a signal from component 46 compared to the color maintained when operating on a signal from component 52. An example of such a circuit for this purpose is found in "SINGLE LED ANALOG METER" on pages 81 and 82 of the September 1981 *Popular Electronics*.

For operation in conditions that provide preferred operator reference to audible operating signals, tone transducer 50 may be actuated continuously at all times that the temperature is not at the set-point value. This may be accomplished in various acceptable ways including applying a signal to 46 when another light 54 is actuated or by applying a signal to 46 when 48 is actuated.

Temperature control component 52 may be a mechanical switch that closes in response to a low temperature condition, such as, for example, a Fenwal Model 17000 or it may be a solid state proportional controller operating in response to a thermistor signal or a thermocouple signal as represented by 56. Indicator light 54 may be a 115 V neon, incandescent lamp, or a solid state LED in the case that 52 is a solid state controller.

The component of the circuit thus far described, except for thermistor signaling component 56, are carried by the housing and, specifically, within the housing structure 24. In this regard, it will be noted from FIG. 1 that switch 44 is mounted within the juncture between the pistol grip handle 26 and the forwardly extending portion 28 thereof so as to be conveniently engaged by the operator's thumb. Flashing light 48 is carried by housing structure 24 at the upper surface thereof and light 54 is mounted adjacent thereto. The thermistor signaling component 56 is embodied within the heatable member 34 in conjunction with pairs of resistance heating coils 58 and 60. Resistance heaters 58 and 60 may be cartridge units, serpentine tubular units, or other electrically isolated resistance heaters such as those manufactured by Ogden, Indeeco, HotWatt, or Watlow. It is preferred to operate heaters 58 continuously to produce temperatures just below the desired temperature for the lowest melting thermoplastics. This usually requires about 100 to 150 watts or 50 to 75 watts in each of the two units. Heaters 60 are operated in response to temperature controller 52 to produce a close cycling about a set point.

Another difficulty that the present invention overcomes is overheating of electronic components due to heat transfer from heating platen member 34. Fusion welding of popular polyolefins including polyethylene, polypropylene, and polybutylene requires platen 34 to be maintained at temperatures up to about 290° C. Most industrial grade electronics are subject to damage at temperatures over about 70° C. and military specification components are seldom rated for continuous use over 120° C. Pipe fitters and plumbers will often use the heating device 12 in situations that require hours of overhead welding. Connections of overhead automatic sprinklers for fire prevention illustrates a typical requirement for tiring overhead work. It is important, therefore, that the heating device 12 provide a lightweight, compact, conveniently handled structure which prevents heat transfer from platen 34 to housing structure 24 in order to protect the electronic components located there. Such protection is afforded by the mounting brackets 32 and heat insulating material 36 which produce a 55° C. temperature drop between the platen 34 and brackets 32 and about a 35° C. temperature drop between brackets 32 and the housing structure 24. The arrangement is such as to allow housing structure 24 to operate at steady state temperatures under 65° while heating member 34 is at 300° C.

In order to reach remote locations in attics, between floor joists, between wall studs and in other areas where plumbing components are hidden, a preferred embodiment of the heating device 12 provides a heating member 34 that is about ½" thick and about 2" wide. This member is particularly suited for welding ⅜" through 1½" copper-tube size thermoplastic fittings and pipe. For welding 1½" to 2" copper-tube sides and 1" to 2" tube sizes of thermoplastic pipe and fittings a heating member 34 about ¾" thick and about 3" wide 10 is preferably used.

Referring now more particularly to FIGS. 1 and 3, the clamping device 14 consists essentially of a conventional pair of vise grip pliers, generally indicated at 62, of the adjustable releasable locking type, and an adjustable pipe clamping assembly, generally indicated at 64, operatively connected therewith. As best shown in FIG. 1, the pliers 62 include a pair of jaw members 66, a pair of squeezable handles 68, a toggle linkage 70, a toggle adjusting member 72 and a toggle releasing member 74. The parts are pivotally interrelated so that the jaw members 66 are pivotally movable from an open position in a direction toward one another in response to a manual squeezing action applied to the handles into a gripping position wherein the jaw members are locked by the toggle linkage 70 a predetermined distance apart (or in engagement) as determined by the setting of the adjusting member 72. The releasing member 74 is manually actuated to release the toggle linkage 70 from its locked position so as to permit the jaw members 66 to be moved apart.

The adjustable pipe clamping assembly 64 includes a pair of outer pipe clamping members 76 preferably in the form of a pair of complementary concavo-convexly arcuately formed metal straps welded at one of their ends to the jaw members 66 so as to move therewith. Clamping members 76 provide oppositely facing concavely arcuate surfaces 78 which are adapted to be arcuate about a common centerline when the pliers 62 are disposed in one adjusted locked position.

The adjustable pipe clamping assembly 64 also includes a set of separate inner pipe clamping members 80, 82 and 84 detachably fixed to each outer pipe clamping member 76. Each set of clamping members constitutes a neated set of concavo-convexly arcuate strap members of incrementally diminishing sizes. As best shown in FIG. 3, the outermost separate member 80 of each set has an outer convexly arcuate periphery 86 which is of the same arcuate size as the concavely arcuate interior peripheral surface 78 and a concavely arcuate interior periphery 88 of a lesser size. A convexly arcuate outer periphery 90 of each intermediate member 82 corresponds in size to the periphery 88. Each intermediate separate member 82 has a concavely arcuate interior periphery 92 which is of the same size as a convexly arcuate exterior periphery 94 of the associated innermost separate member 84. Finally, the innermost separate member 84 has a concavely arcuate interior periphery 96.

Each set of separate members and the associated fixed member is formed with a central opening 98. The openings 98 are aligned to receive a threaded fastener 100 which has a tapered flat head seated in the innermost opening 98 and a threaded free end extending through the opening 98 in the associated fixed member 76. A wing nut 102 threaded on the free end of the fastener 100 serves to detachably secure each set of separate members to the associated fixed member.

The secondary handle and depth gauge assembly 16 preferably includes a molded body of suitable plastic material providing a tapered handle portion 104 and enlarged depth gauge socket portion 106 on one end thereof. The opposite end of the handle portion 104 has a stud 108 fixed thereto and extending outwardly therefrom for engaging within a threaded opening 110 formed in the housing structure 24. In the drawings, the opening 110 is shown on one side of the housing. It will be understood that a similar opening is provided on the opposite side for receiving the stud 108 to accommodate left-handed flow of work.

As best shown in FIG. 3, a second threaded cap screw 112 is threaded within a bore of the other end of the handle portion 104 and extends axially within the depth gauge socket portion 106. A circular depth gauge stop-disk 114 is mounted within the socket portion 106 and has an interior threaded hub 116 which is threadedly engaged and fixed on the cap screw 112. It can be seen that the depth gauge stop-disk 116 can be turned to move into any one of a multiplicity of adjusted positions within the socket member.

FIGS. 3 through 6 illustrate the use of the apparatus 10, as thus far described, in fusion welding a joint between a pipe, indicated by the numeral 122, and a fitting 124 having a socket portion 126 for receiving the pipe end therein to form the joint.

As a preliminary to the use of the apparatus, as depicted in FIG. 3 through 6, it should be noted that in order to make good welds, it is necessary to have clean surfaces in the areas to be fused. Pipe cutting must be done in a way that produces burrfree, square ends. An inexpensive tool for cutting thermoplastic tubing and pipe is disclosed in U.S. Pat. No. 4,336,652, the disclosure of which is hereby incorporated by reference into the present specification. In accordance with the principles of the present invention, the tool of U.S. Pat. No. 4,336,652 can be improved by providing a wet cleaning sponge of arcuate shape in a channel formed in each of the seats 62. The sponges project out of the channels so as to be squeezed by the pipe before surfaces 62 are engaged in the normal operation of the tool. The result is that as the pipe is rotated against the blade, it is cleaned by the sponges and moistened. The moistening by water or other polar solvents such as alcohols is particularly helpful in reducing friction between components of the cutter and the pipe being cut while cleaning the surface of the pipe on both sides of the cut-plate. Thus two areas are cleaned and made ready for joining with less effort than normal cutting with conventional cut-off tools. The same improvements of providing simultaneous cleaning and lubrication by a spring urged sponge assembly can also be applied to cutters of other designs such as conventional wheel cutters and ratchet cutters, such as Ridgid Parts No. 33075 and No. 91125. To illustrate the unexpected advantage of moistening the surface of the pipe being cut, it has been found that with equal clamping force on the blade, the cleaning and moistening functions of the improvements of the present invention allows the pipe to be repeatedly cut in about 35% of the time required without the cleaning and moistening operation. A further advantage is that less clamping force is needed and as a result the tool distortion is less. Cuts made by the improved cut-off tool are square with the pipe whereas cuts made without moistening and cleaning, rapidly dull the blade and are often crooked. The result is that the pipe-end is prepared for welding by being cleaned and cut squarely with reduced drag because of the beneficial lubricating action of the cleansing fluid upon the polymer.

The depth of the fitting socket 126 is measured and the adjustable depth gauge stop-disk 114 is moved inwardly to the measured distance from edge 118 in response to the action of cap screw 112 within the threaded bore of handle 104. As best shown in FIG. 3, the pipe cut to the desired length is inserted into the socket portion 106 until the cut edge of the pipe engages stop-disk 116. Next, after selecting the correct number of separate members 80, 82, and 84 to fit the pipe joint size, the clamping device 16 is moved into locked position in rounding relation to the pipe periphery in a location against the depth gauge edge 118. The pipe 122 with the clamping device 16 locked in rounding relation to the periphery thereof is then removed from the depth gauge assembly 18 preparatory to the heating steps of the operation.

It is preferred to manufacture the socket members 40 and 42 with combination plug and socket details in each unit. As shown in FIG. 2, heat-transfer unit 40 offers a combination of exterior plug and interior socket. This provides the advantages of weight reduction and savings of set up time for installation of several pipe or tubing sizes.

As previously indicated, the heating device 12 is normally maintained at a temperature approximating the desired set temperature by the temperature controller 52 including the thermostat or sensor 56. The heating steps can be performed by the operator grasping the pistol grip handle 56 and holding the same in a position exposing the outer ends of the heatable members 40 and 42. This preparatory position is illustrated in FIG. 4. Next, the operator or a helper effects a relative move between the pipe 122, the heating member of the heating device 12 and the fitting 124 so as to move the pipe end within the inventive heatable combination plug and socket member 40 and the socket portion 126 of the fitting 124 over the heatable socket member 42. As soon as this connection has been made, as shown in FIG. 5, the operator now observes the next successive simultaneous light flashes from flasher 48 and beep tones from the sound attenuator 50 until a number is reached with is equal to the number of seconds which the parts are to be heated. Exemplary fusion times are for a ¾" nominal diameter joint 7-9 seconds, for a 1" nominal diameter joint 8-10 seconds, for a 1¼" nominal diameter joint 10-12 seconds, for a 1½" nominal diameter joint 12-15 seconds, and for a 2" nominal diameter joint 12-15 seconds. Exemplary temperatures are for polyethylene 475°-480° F., for polypropylene 500° F., for polybutylene 525° F., for polycarbonate 545°-550° F., for Kynar (PVDF) 565°-575° F.

As soon as the light and beep tone have signaled the correct number of heating seconds, the pipe 122 and fitting 124 are removed from members 40 and 42 and moved into interengagement, as shown in FIG. 6, using the clamping device 16 as a stop and alignment fixture. The pipe and fitting are held together for about 20 seconds before releasing axial pressure and removing the clamping device 16. Light signal 48 and tone signal 50 are utilized to signal the completion of the 20 second cooling period.

The utilization of the timing signal for determining the exact timing of the heating as well as the subsequent cooling step is particularly important in achieving good results. Too much heating input can result in restricting the bore, bunching of the pipe wall and degradation of polymer. Too little heat can result in a weak weldment with low flexural strength and inadequate shear strength with resultant leakage after low cycle fatigue. By providing precision tone beeps and light signals on one second intervals, accurate timing is insured. Operators of prior art systems, such as depicted in U.S. Pat. No. 3,802,943, as aforesaid, attempted to determine the heating time as a matter of judgment such as by counting one thousand and one, one thousand and two and so forth to provide a judgment estimate for the end of the heating step. With the present signaling arrangement, the human tendency to lose count is eliminated.

While the convenience of the pistol grip handle of the heating device 12 is an important aspect of the present invention, there are occasions when the joints can be effected with the heating device held in a fixed position. To this end, the C-clamp mounting assembly 18 provides a simple structure for accomplishing this purpose in a great variety of different situations. As shown, the assembly 18 includes a C-frame, one leg of which is formed with a T-slot 130 for receiving therein the mounting plate 30 fixed to and extending forwardly from the pistol grip handle 26. A locking screw 133 may be provided for securely locking the clamping plate 30 within the T-slot 130. The opposite leg of the C-shape frame 128 is formed with a threaded opening 132 for receiving a threaded shank 134 therein. One end of the shank is formed with a swivel gripping element 136 thereon and the opposite end is provided with a turning handle 138.

By turning knob 138 to move the swivel gripping element 136 into gripping engagement with a suitable stationary object, the C-clamp mounting assembly 18 is operable to fix the heating device 12 in a position to be used so as to free the hands of the operator to perform the other steps in the operation. The mounting assembly 18 would serve to fix the heating device 12 to work tables, ladder steps, laddr masts, floor joists, rafters, wall studs and other steady objects.

Where operations are to be carried out at one location for fairly extensive periods of time or at other locations to which a work table could be moved, it is preferable to utilize a mounting assembly of a modified form, generally indicated by the numeral 140, in FIGS. 9 and 10. As previously indicated, the assembly 140 is articularly adapted to cooperate with a work table or bench, indicated at 142 in FIGS. 9 and 10. The assembly 140 includes a pocket defining housing 144 which is preferably formed of sheet metal bent into a U-shaped cross-sectional configuration with the free ends of the legs bent inwardly toward one another, as indicated at 145, to form mounting plates by which the housing is secured to a side of the table or work bench 142. Fixed to one leg of the pocket defining housing 144 is a first hinge element 146. The hinge element 146 is suitable fixed as by welding or by fasteners so that a hinge pin 148 carried thereby is disposed above the associated upper edge of the pocket defining housing 144. A second hinge element is hinged to the pivot pin 148 and in turn is apertured to receive bolts 152 which extend through openings 154 formed in the clamping plate 30. As best shown in FIG. 10, when the hinge element 150 is disposed in a position adjacent to and along side the hinge element 146, the heating member 34 of theheating device 12 is mounted in a position above the upper surface 156 of the table 142. This operating position of the heating device 12 is shown in solid lines in FIG. 10. When the device is not in use on the table, it is pivoted about the pivot pin 148 from the operating position in a clockwise direction ,as viewed in FIG. 10, into a safe storage position, shown in dotted lines wherein the heating member 34 is disposed within the pocket defined by the housing 144.

When the device is used with the operator manually gripping the pistol grip handle 26 or with the C-clamp mounting assembly 18, it is preferable to utilize at least one shield assembly 20. Each shield assembly 20 is formed of a wire 158 which is initially bent into a U-shape configuration. The free ends of the legs of the U-shape wire are then bent inwardly, as indicated at 160, so as to extend toward one another. Finally, a central portion of the legs are bent at right angles, as indicated at 162. Extending over the bight portion of the U-shape wire 158 and the portion of the legs almost up to the bends 162 is a fabric cover or sock 164. The form-fitting sock 164, which is slipped over the aforesaid portions of the U-shaped wire, consists essentially of fireproof thermally insulating woven roving. An exemplary roving is one of 1/16" diameter made up from asbestos, alumina ($Al_2O_3$) or glass fibers of 0.0001 to 0.001" nominal diameter.

Formed in each of the mounting brackets 32 at positions adjacent the housing structure 24 is a pair of openings 166, the opening of each pair in the upper bracket 32 being aligned with a corresponding opening of the pair in the lower bracket 32. Each pair of aligned openings permits a shield assembly 20 to be detachably mounted therein by spreading the in-turned free ends 160 and allowing them to engage within the aligned openings 166. In this way, the shield assembly 20 is mounted for pivotal movement between a shielding position, as shown in FIG. 2, wherein the sock 164 extends over 10 the outer end of the associated heatable member and an access position displaced 90° therefrom, as shown in FIG. 1, permitting access to the associated heatable member.

A pair of spring detents 168 are provided for releasably maintaining the shielding device in its shielding position. As shown in FIGS. 1 and 2, a single shielding device 12 is often selected when the secondary handle and depth gauge assembly 16 is utilized as a part of the heating device 12. Under these circumstances, the shielding assembly 20 would be mounted on the opposite side of the device 12 from the depth gauge assembly 16. Of course these sides can be reversed and a second shielding assembly 20 can be provided if desired including the attachment of depth gauge assembly 16.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed:

1. Apparatus for use in fusion welding joints in a plastic pipe system comprising:
   a heating device including;
   a housing providing a rearwardly disposed pistol grip handle,
   a heating member having opposed sides facing in directions corresponding to opposed sides of said pistol grip handle,
   means for securing said heating member in heat insulating relation to said housing in a forwardly extending position with respect to said pistol grip handle,
   a secondary handle structure detachably fixedly secured to a side of said housing at one end thereof and extending outwardly therefrom,
   depth gauge means on the outer end of said secondary handle for receiving the end of a plastic pipe and determining the depth to which said pipe end should be heated to fusion weld the same into a mating socket of a plastic fitting,
   a clamping device operable to be clamped in rounding engagement with the exterior periphery of the plastic pipe at a position inwardly of the depth thereof determined by said depth gauge means,
   a heatable socket member detachably fixedly secured to one side of said heating member for receiving in heat conducting relation therein a plastic pipe end up to the depth determined by the position of said clamping device thereon,
   a heatable plug member detachably fixedly secured to the other side of said heating member for receiving in heat transmitting relation thereof a mating socket of a plastic fitting,
   said heating device further including means for controllably heating said heating member so as to bring said heatable socket member and said heatable plug member to a desired temperature, and
   timing signal means for providing signal means for enabling an operator to determine the time when the pipe end and mating socket should be removed from heat transmitting relation with the heated socket and plug members respectively.

2. Apparatus as defined in claim 1 wherein said depth gauge means comprises a tubular member having an outer free peripheral edge and an interior opening extending inwardly thereof for receiving a plastic pipe end therein, a separate pipe edge engaging wall within said interior opening for engaging the edge of a plastic pipe end received within said interior opening and means for fixedly mounting said separate wall in a selected one of a plurality of axially spaced positions of adjustment within said interior opening.

3. Apparatus as defined in claim 2 wherein said wall mounting means comprises a threaded stud fixed with respect to said secondary handle and said tubular member and disposed axially within said interior opening, said separate wall being circular and having a central hub threadedly mounted on said threaded stud for movement axially in response to a turning movement with respect to said stud.

4. Apparatus as defined in claim 1 wherein said clamping device comprises a pair of handle members, a pair of jaw member, an adjustable and releasable toggle linkage and means for connecting said members together with said toggle linkage so that said jaw members will be moved from an open poition into a closed position in response to a manual squeezing action on said handles, with said toggle linkage enabling said jaw members to be releasably locked into any selective one of a plurality of operative closed positions wherein said jaw members are spaced a plurality of different distances apart,
   a pair of pipe clamping members fixed to said pair of jaw members for movement therewith having opposd concavely arcuate pipe periphery engaging surfaces, and
   a plurality of separate concavo-convex arcuate pipe periphery engaging members detachably fixedly secured in mating relation with the arcuate pipe engaging surfaces of said pipe clamping members whereby by selective retaining or removing the fixedly secured relation of said separate arcuate members with respect to said clamping members and by corresponding adjustment of said toggle linkage said jaw members can be releasably locked into any one of a plurality of selected operative positions wherein the periphery of any one pipe within a plurality of different sizes can be engaged in rounded relation.

5. Apparatus as defined in claim 4 wherein said separate arcuate members include a set of three separate arcuate members of incrementally mating sizes detachably secured to each clamping member.

6. Apparatus as defined in claim 5 wherein each set of three arcuate members is detachable fixedly secured to its associated clamping member by means of a headed and threaded fastener extending through aligned recessed apertures in said separate arcuate members and a registering aperture in the associated clamping member and a wing nut threadedly engaged on the threaded end of said fastener.

7. Apparatus as defined in claim 1 wherein said pistol grip handle includes a mounting plate extending forwardly from the lower end thereof and means for engaging said mounting plate and securing said heating device in a fixed position of operation.

8. Apparatus as defined in claim 7 wherein said mounting plate engaging means includes a C-clamp assembly having means for receiving said mounting plate in heating device supporting relation therein.

9. Apparatus as defined in claim 7 wherein said mounting plate engaging means includes a hinge element to which said mounting plate is fixedly secured, a pocket adapted to be mounted to a vertical surface of a table top providing device in a position below an upwardly facing surface of the table top provided, and means for hingedly mounting said hinge element and hence the heating device and mounting plate thereof fixedly secured thereto between an operative position wherein the heating member is disposed above the level of the upwardly facing table top surface and a storage position wherein said heating member is disposed within said pocket.

10. Apparatus as defined in claim 9 wherein said timing signal means comprises means for producing a series of signals of short endurance at predetermined time intervals therebetween.

11. Apparatus as defined in claim 10 wherein said signals are visual.

12. Apparatus as defined in claim 10 wherein said signals are audible.

13. Apparatus as defined in claim 10 wherein the time interval between signals is one second.

14. Apparatus as defined in claim 13 wherein each signal is a simultaneous visual flash of light and audible beep.

15. Apparatus as defined in claim 1 wherein said timing signal means comprises means for producing a series of signals of short endurance at predetermined time intervals therebetween.

16. Apparatus as defined in claim 15 wherein said signals are visual.

17. Apparatus as defined in claim 15 wherein said signals are audible.

18. Apparatus as defined in claim 15 wherein the time interval between signals is one second.

19. Apparatus as defined in claim 18 wherein each signal is a simulataneous visual flash of light and audible beep.

20. Apparatus as defined in claim 1 wherein said heating member securing means comprises a pair of hairpin spring like mounting elements fixed in shock absorbing as well as heat insulating relation between said housing and said heating member.

21. Apparatus as defined in claim 20 wherein said housing has shield means detachably carried thereby for movement between a shielding position along the outer side of at least one of said heatable members so as to shield the same from contact and an operative access position providing access to said one heatable member.

22. Apparatus as defined in claim 21 wherein said shield means includes a wire bent into a U-shaped configuration with the free ends of its legs bent inwardly toward one another and with the legs having a central 90° bend therein, said wire being detachably mounted in aligned openings in said mounting elements by engaging the bent free ends of the legs therein and being releasably retained in said shielding position by a spring detent.

23. Apparatus as defined in claim 22 wherein said shield means includes a sleeve of heat resisting material extending over the bight portion and the adjacent straight leg portions of the U-shaped wire.

24. Apparatus for use with a clamping device in effecting fusion welding of joints in a plastic pipe system comprising:
a heating device including;
a housing providing a rearwardly disposed pistol grip handle,
a heating member having opposed sides facing in directions corresponding to opposed sides of said pistol grip handle,
means for securing said heating membr in heat insulating relation to said housing in a forwardly extending position with respect to said pistol grip handle,
a secondary handle structure detachably fixedly secured to a side of said housing at one end thereof and extending outwardly therefrom,
depth gauge means on the outer end of said secondary handle for receiving the end of a plastic pipe and determining the depth to which the clamping device should be applied to said pipe end for limiting the depth of the pipe end to be heated to fusion weld the same into a mating socket of a plastic fitting,
a heatable socket member detachably fixedly secured to one side of said heating member for receiving in heat conduction relation therein a plastic pipe end up to the depth determined by the position of a clamping device thereon, and
a heatable plug member detachably fixedly secured to the other side of said heating member for receiving in heat transmitting relation thereover a mating socket of a plastic fitting,
said depth gauge means comprising:
a tubular member having an outer free peripheral edge and an interior opening extending inwardly thereof for receiving a plastic pipe end therein,
a separate pipe edge enagaging wall within said interior opening for engaging the edge of a plastic pipe end received within said interior opening, and
means for fixedly mounting said separate wall in a selected one of a plurality of axially spaced positions of adjustment within said interior opening.

25. Apparatus as defined in claim 24 wherein said wall mounting means comprises a threaded stud fixed with respect to said secondary handle and said tubular member and disposed axially within said interior opening, said separate wall being circular and having a central hub threadedly mounted on said threaded stud for movement axially in response to a turning movement with respect to said stud.

26. Apparatus for use in fusion welding joints in a plastic pipe system comprising:
a heating device including;
a housing providing a rearwardly disposed pistol grip handle,
a heating member having opposed sides facing in directions corresponding to opposed sides of said pistol grip handle,
means for securing said heating member in heat insulating relation to said housing in a forwardly extending position with respect to said pistol grip handle,
a heatable socket member detachably fixedly secured to one side of said heating member for receiving in heat conducting relation therein a plastic pipe end up to the depth determined by the position of a clamping device thereon as determined by the application of a depth gauge means thereto, a heatable plug member detachably fixedly secured to the other side of said heating member for receiving in heat transmitting relation thereover a mating socket of a plastic fitting, means for controllably heating said heating member so as to bring said heatable socket member and said heatable plug member to a desired temperature, timing signal means for providing signal means for enabling an operator to determine the time when the pipe end and mating socket should be removed from heat transmitting relation with the heated socket and plug members respectively, said pistol grip handle including a mounting plate extending forwardly from the lower end thereof, and means for engaging said mounting plate and securing said heating device in a fixed position of operation.

27. Apparatus as defined in claim 26 wherein said mounting plate engaging means includes a C-clamp assembly having means for receiving said mounting plate in heating device supporting relation therein.

28. Apparatus as defined in claim 26 wherein said mounting plate engaging means inludes a hinge element to which said mounting plate is fixedly secured, a pocket adapted to be mounted to a vertical surface of a table top providing device in a position below an upwardly facing surface of the table top provided, and means for hingedly mounting said hinge element and hence the heating device and mounting plate thereof fixedly secured thereto between an operative position wherein the heating member is disposed above the level of the upwardly facing table top surface and a storage position wherein said heating member is disposed within said pocket.

29. Apparatus as defined in claim 26 wherein said timing signal means comprises means for producing a series of signals of short endurance at predetermined time intervals therebetween.

30. Apparatus as defined in claim 29 wherein said signals are visual.

31. Apparatus as defined in claim 29 wherein said signals are audible.

32. Apparatus as defined in claim 29 wherein the time interval between signals is one second.

33. Apparatus as defined in claim 32 wherein each signal is a simultaneous visual flash of light and audible beep.

34. Apparatus for use in fusion welding joints in a plastic pipe system comprising:

a heating device including;

a housing providing a rearwardly disposed pistol grip handle, a heating member having opposed sides facing in directions coresponding to opposed sides of said pistol grip handle, means for securing said heating member in heat insulating relation to said housing in a forwardly extending position with respect to said pistol grip handle, a heatable socket member detachably fixedly secured to one side of said heating member for receiving in heat conducting relation therein a plastic pipe end, a heatable plug member detachably fixedly secured to the other side of said heating member for receiving in heat transmitting relation thereover a mating socket of a plastic fitting, means for controllably heating said heating member so as to bring said heatable socket member and said heatable plug member to a desired temperature, timing signal means for providing signal means for enabling an operator to determine the time when the pipe end and mating socket should be removed from heat transmitting relation with the heated socket and plug members respectively, and shield means detachably carried by said housing for movement between a shielding position along the outer side of at least one of said heatable members so as to shield the same from contact and an operative access position providing access to said one heatable member.

35. Apparatus as defined in claim 34 wherein said shield means includes a wire bent into a U-shaped configuration with the free ends of its legs bent inwardly toward one another and with the legs having a central 90° bend therein.

36. Apparatus as defined in claim 35 wherein said heating member securing means comprises a pair of hairpin spring like mounting elements fixed in shock absorbing relation as well as heat insulating relation between said housing and said heating member, said mounting elements having aligned openings therein receiving the bent free ends of the legs of said wire therein, said wire being releasably retained in said shielding position by a spring detent.

37. Apparatus as defined in claim 36 wherein said shield means includes a sleeve of heat resisting material extending over the bight portion and the adjacent straight leg portions of the U-shaped wire.

* * * * *